(12) United States Patent
Wiechers

(10) Patent No.: US 10,185,328 B2
(45) Date of Patent: Jan. 22, 2019

(54) METHOD FOR PASSING ON AT LEAST ONE CONSIGNMENT FROM A TRANSFERRING VEHICLE TO A RECEIVING VEHICLE, AND TRANSFERRING VEHICLE

(71) Applicant: Ralph Wiechers, Mayschoß (DE)

(72) Inventor: Ralph Wiechers, Mayschoß (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 15/246,288

(22) Filed: Aug. 24, 2016

(65) Prior Publication Data

US 2017/0068250 A1  Mar. 9, 2017

(30) Foreign Application Priority Data

Sep. 3, 2015  (DE) .......... 10 2015 114 772

(51) Int. Cl.
*G05D 1/02* (2006.01)
*B65G 67/22* (2006.01)
(Continued)

(52) U.S. Cl.
CPC .............. *G05D 1/0291* (2013.01); *B60P 1/00* (2013.01); *B62D 15/026* (2013.01); *B65G 67/22* (2013.01);
(Continued)

(58) Field of Classification Search
CPC .............. G05D 1/0291; G05D 1/0293; G05D 2201/0213; B60P 1/00; B62D 15/026; B65G 67/22; G06Q 10/083
See application file for complete search history.

(56) References Cited

U.S. PATENT DOCUMENTS 7,537,519 B2 * 5/2009 Huster ................. A01D 43/087
141/231
7,648,413 B2 * 1/2010 Duquesne ............ A01D 41/127
460/112
(Continued)

FOREIGN PATENT DOCUMENTS

CN  1460082 A  12/2003
CN  102020009 A  4/2011
(Continued)

*Primary Examiner* — Tuan C To
(74) *Attorney, Agent, or Firm* — Robert Boerner Van Deuren P.C.

(57) ABSTRACT

A method for passing on at least one consignment from a transferring vehicle to a receiving vehicle in which the transferring vehicle and the receiving vehicle are made to roughly approach one another, in which, after the transferring vehicle and the receiving vehicle have been made to roughly approach one another, they are made to approach one another precisely while approximating the speeds and the directions of travel of the transferring vehicle and the receiving vehicle to one another, in which, while the transferring vehicle and the receiving vehicle are traveling with speeds and directions of travel which are approximate to one another, the at least one consignment is transferred from the transferring vehicle to the receiving vehicle, and in which, after the transfer of the at least one consignment has taken place, the transferring vehicle and the receiving vehicle move away from one another.

18 Claims, 15 Drawing Sheets

(51) Int. Cl.
    *B60P 1/00*         (2006.01)
    *B62D 15/02*      (2006.01)
    *G06Q 10/08*      (2012.01)

(52) U.S. Cl.
    CPC ......... *G05D 1/0293* (2013.01); *G06Q 10/083* (2013.01); *G05D 2201/0213* (2013.01)

(56) References Cited

U.S. PATENT DOCUMENTS

| | | |
|---|---|---|
| 2002/0175248 A1 | 11/2002 | Fox |
| 2006/0150584 A1 | 7/2006 | Weiss |
| 2009/0045290 A1 | 2/2009 | Small et al. |
| 2010/0332051 A1* | 12/2010 | Kormann ............. A01D 43/073 701/2 |
| 2011/0307149 A1* | 12/2011 | Pighi .................... A01D 41/127 701/50 |
| 2013/0211675 A1* | 8/2013 | Bonefas ................ B62D 12/02 701/41 |
| 2017/0042088 A1* | 2/2017 | Nykamp ............. A01D 43/087 |

FOREIGN PATENT DOCUMENTS

| | | |
|---|---|---|
| CN | 104044587 A | 9/2014 |
| DE | 195 32 070 | 3/1997 |
| DE | 10 2011 121 414 A1 | 6/2013 |
| DE | 10 2012 214 750 A1 | 11/2013 |
| KR | 10-2012-0015896 A | 2/2012 |
| WO | WO 2013/079247 A1 | 6/2013 |
| WO | WO 2014/184045 A1 | 11/2014 |

\* cited by examiner

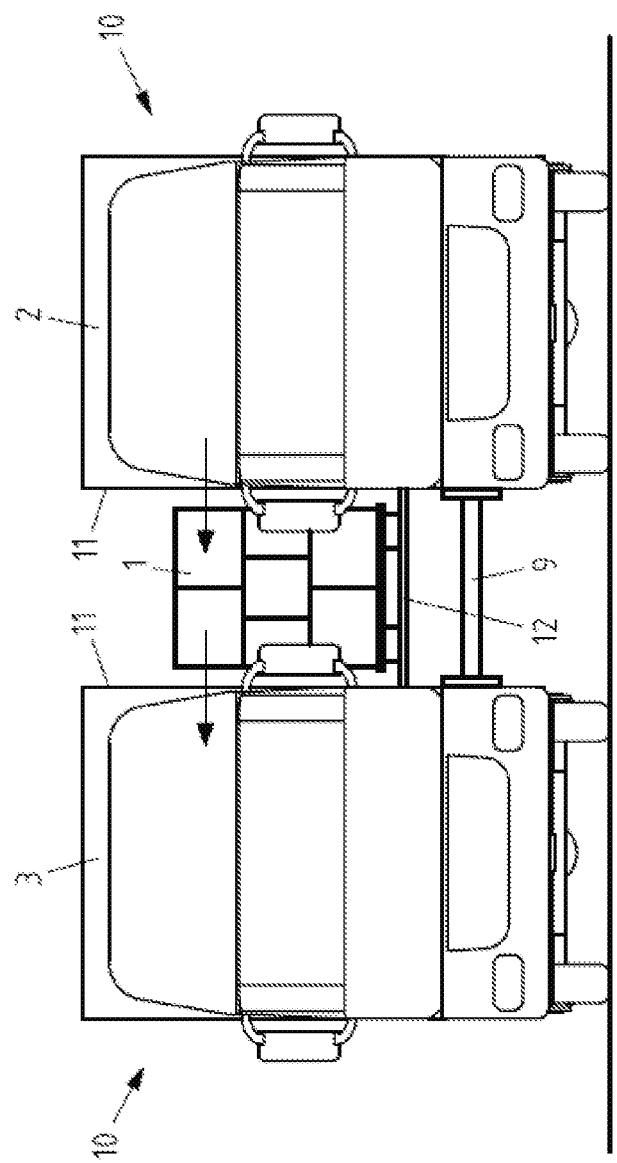

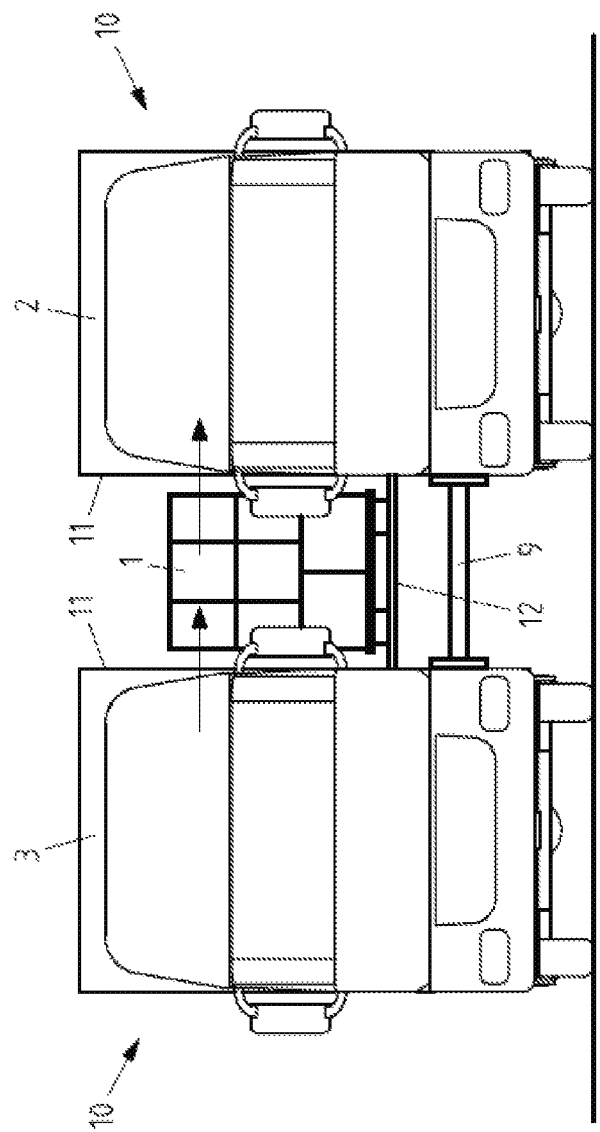

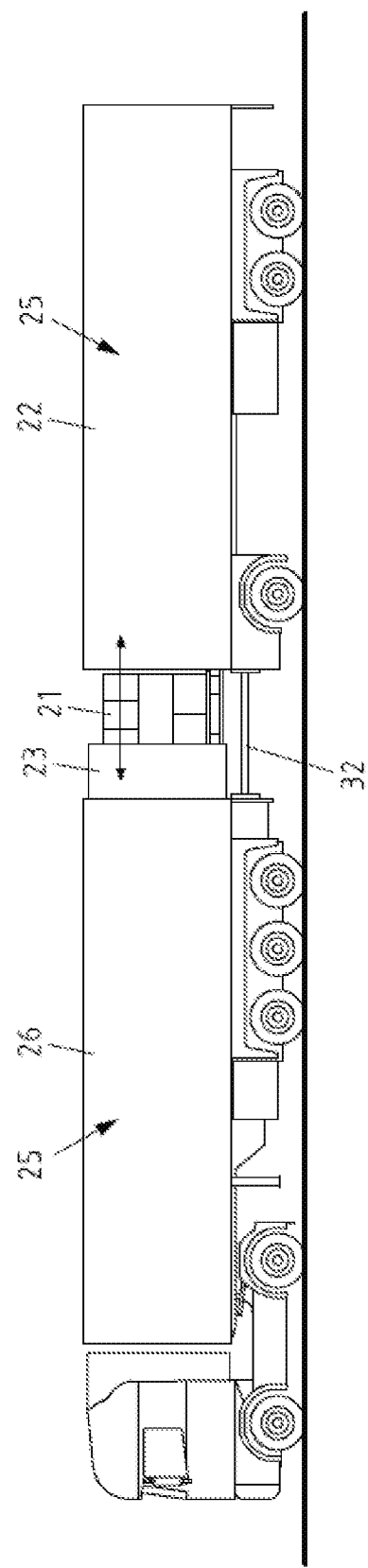

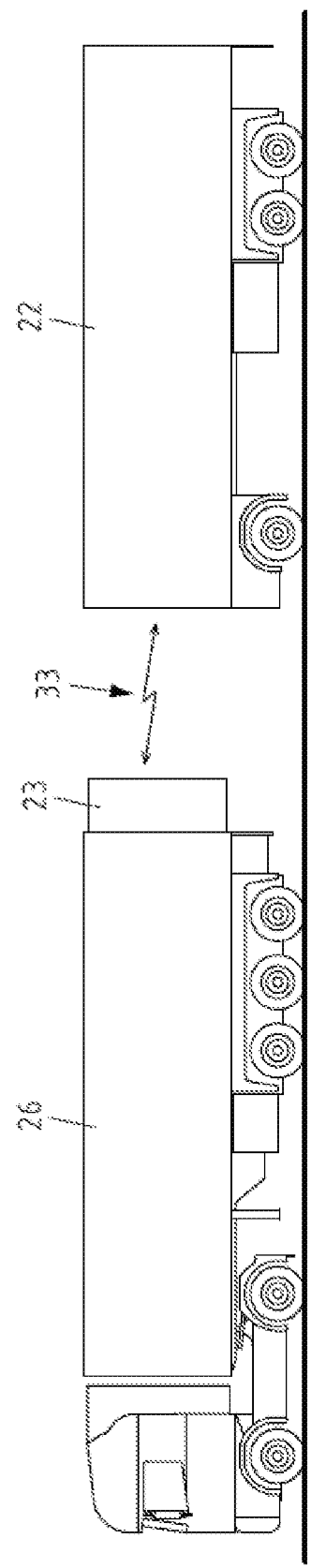

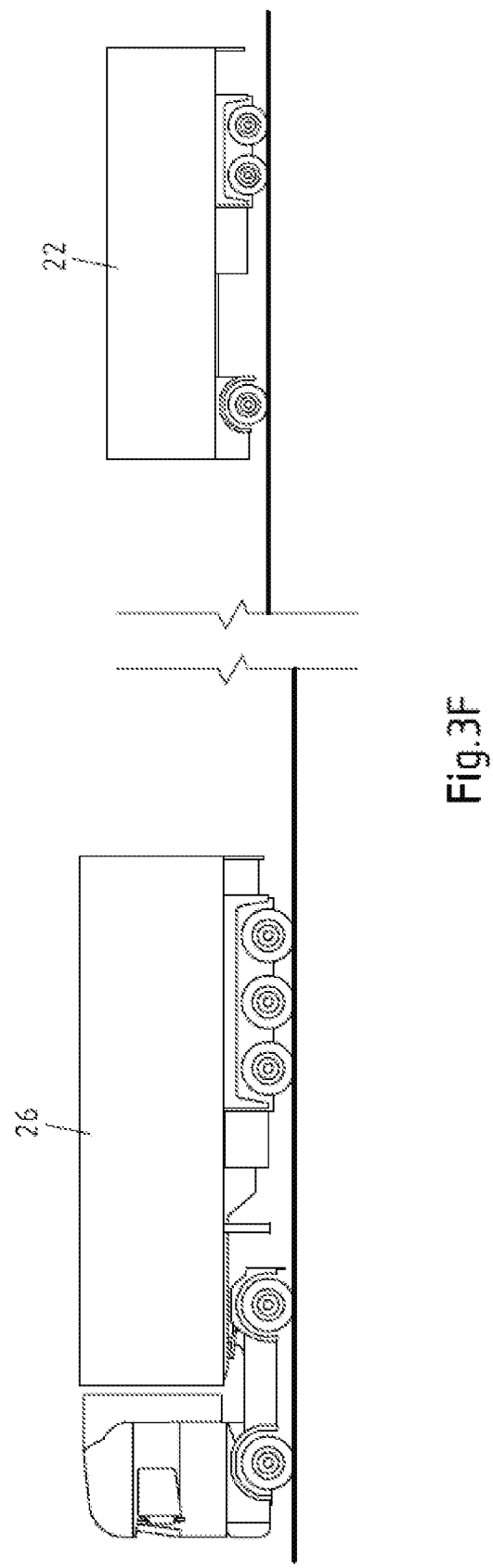

METHOD FOR PASSING ON AT LEAST ONE CONSIGNMENT FROM A TRANSFERRING VEHICLE TO A RECEIVING VEHICLE, AND TRANSFERRING VEHICLE

CROSS-REFERENCE TO RELATED PATENT APPLICATION

This patent application claims priority to German Application No. 10 2015 114 772.6, filed Sep. 3, 2015, the entire teachings and disclosure of which are incorporated herein by reference thereto.

FIELD

The invention relates to a method for passing on at least one consignment from a transferring vehicle to a receiving vehicle. In addition, the invention relates to a transferring vehicle for performing the method.

BACKGROUND

In modern goods traffic, consignments are usually not transported directly to a predefined destination but rather in several stages, with the consignments being transported with different means of transportation in the stages. By the time the consignments reach the predetermined destination, the consignments are therefore often reloaded repeatedly. In many cases, the reloading occurs directly from one land vehicle to another land vehicle, with the land vehicle used being one which is usually provided for transporting goods over the public road network. In particular, the vehicle is a utility vehicle, that is to say a vehicle which is not designed specifically for conveying passengers but rather, in particular, for transporting payload, that is to say goods, merchandise, consignments and the like. Utility vehicles in this context are, in particular, trucks, trailers, semitrailers and the like.

The consignments can be reloaded directly from one vehicle to another vehicle or else also stored intermediately. In many cases, the vehicles usually travel to special trans-shipment centers where the reloading of the consignments takes place. The vehicle delivering the consignment to be transferred is typically at the trans-shipment center before the vehicle with which the consignment is to be transported further, with the result that the consignment is, where required, intermediately stored in a warehouse. As a result of the reloading of the consignments, consignments can be combined to form a common freight shipment which is transported together over a specific route. At the destination of the freight shipment, the consignments are reloaded again and combined again in another combination to form a freight shipment which has to be tranported in the same direction. It is therefore possible to avoid unnecessary journeys or journeys with vehicles which are not fully loaded. This method, not least, reduces transportation costs. However, the reloading of the consignments between the starting point and the destination of the consignment entails a certain time loss and reduces the flexibility for the transportation of individual consignments. If very flexible and/or very rapid transportation of consignments is to take place, the consignments are therefore often delivered directly, that is to say taken to the destination directly. However, this generally entails higher costs, specifically, in particular, if the consignment only partially takes up the loading capacity of the utility vehicle, which is often the case in these situations. There is therefore basically a further need for optimization in terms of rapid and reliable but at the same time cost-effective transportation of consignments.

BRIEF SUMMARY OF A NUMBER OF EXEMPLARY EMBODIMENTS OF THE INVENTION

The present invention is based on the object of configuring and developing the method and the vehicles of the type which have been respectively specified at the beginning and explained in more detail above, in such a way that consignments can, where required, be transported more quickly and more reliably without this leading to an excessive increase in the transportation costs.

This object is achieved according to claim 1 by means of a method for passing on at least one consignment from a transferring vehicle to a receiving vehicle,
in which the transferring vehicle and the receiving vehicle are made to roughly approach one another on the basis of position data of the transferring vehicle and/or of the receiving vehicle,
in which, after the transferring vehicle and the receiving vehicle have been made to roughly approach one another, they are made to approach one another precisely while approximating the speeds and the directions of travel of the transferring vehicle and the receiving vehicle to one another,
in which, while the transferring vehicle and the receiving vehicle are traveling with speeds and directions of travel which are approximate to one another, the at least one consignment is transferred from the transferring vehicle to the receiving vehicle, and
in which, after the transfer of the at least one consignment has taken place, the transferring vehicle and the receiving vehicle move away from one another.

The object specified above is also achieved according to claim 16 by means of a transferring vehicle for performing the method according to claim 1.

The invention has recognized that passing on consignments from a transferring vehicle to a receiving vehicle speeds up the transportation of consignments even though the consignments are transported in stages by different vehicles, to be precise, where necessary, in each case with further consignments which have to be transported partially in the same direction or to the same destination of a stage. It is therefore not necessary to store the consignments intermediately when they are transferred from vehicle to vehicle. Furthermore, unnecessary travel can be avoided. Moreover, it is possible to have recourse to transportation principles and transportation strategies which have been proven in principle, and this has an advantageous effect on the reliability of the transportation of the consignments as far as the destination in a predetermined time. The transferring vehicle and the receiving vehicle can basically be very different vehicles, since the corresponding method is not tied to specific vehicles. However, the method is practical and economical, in particular, when utility vehicles, for example trucks, trailers and/or semitrailers are used.

The consignments are understood here to be very different objects. Consignments can have different shapes, sizes and weights. Piece goods, repacked goods, packaged goods and the like are possible as consignments. Consignments can basically be any type of goods, in particular objects for daily use such as consumables or foodstuffs as well as technical objects and equipment. The consignments can be, if required, person-related. In this case, for example correspondence, packages and/or flyers are possible as consignments. A flyer can be here, if required, a brochure, a periodical and/or a leaflet, while a package can be a small package as well as a packet. In addition, correspondence can be a postcard as well as a letter. However, the consignment can also comprise a multiplicity of pieces of correspondence, packages and/or flyers.

So that a consignment can be transferred from the transferring vehicle to the receiving vehicle, the transferring vehicle and the receiving vehicle must firstly be made to approach one another roughly. This is done on the basis of position data of the transferring vehicle and/or of the receiving vehicle. The position data are preferably determined at regular intervals according to requirements. This can be done by the transferring vehicle and/or the receiving vehicle itself or can be performed externally. On the basis of the position information, the transferring vehicle can be directed toward the receiving vehicle and/or the receiving vehicle can be directed toward the transferring vehicle. This permits the two vehicles to be made to approach one another even over a relatively large distance. Visual contact between the vehicles or the like is not necessary here. By means of the position information it is known where the other vehicle is approximately located. In addition, from the position information it is possible to determine as a function of time the approximate speed at which the vehicle in question is moving, and in which direction it is moving. Therefore, the described method is appropriate, in particular, for the case in which the transferring vehicle and/or the receiving vehicle travel/travels in a similar direction at a similar speed over a relatively long time period. This facilitates, at any rate, the rough approaching of the vehicles to one another over a long distance and avoids unnecessary transportation movements.

The rough approach of the transferring vehicle and the receiving vehicle to one another is followed by a precise approach of the transferring vehicle and receiving vehicle to one another. While the rough approach, for example, causes the transferring and the receiving vehicle to actually come together, the precise approach serves, for example, to bring about the desired orientation of the transferring vehicle and receiving vehicle with respect to one another, in order to be able to transfer the at least one consignment. Therefore, the detection of the relative position and the relative speed of the transferring vehicle and receiving vehicle during the precise approach should, where possible, take place much more accurately than during the rough approach. Furthermore, during the precise approach, the direction of travel and the speed must be approximated. This can be done, for example, by approximating the direction of travel and the speed as the transferring vehicle and receiving vehicle increasingly approach one another spatially.

If the transferring vehicle and the receiving vehicle have approached one another to at least a specific distance, the speeds and the directions of travel have preferably at least essentially approximated to one another, with the result that they are at least essentially the same. However, the speed is not approximated in such a way that the transferring vehicle and the receiving vehicle are braked to a standstill. The directions of travel would then in principle also have approximated to one another. Instead it is the case that the transferring vehicle and the receiving vehicle continue to move even after the approach of the speed and direction of travel, only likewise essentially at the same speed and with the same direction of travel. For example, the transferring vehicle and the receiving vehicle travel one next to the other or one behind the other.

While the transferring vehicle and the receiving vehicle travel preferably at a short distance from one another with a speed and direction of travel which have been approximated to one another, at least one consignment is transferred from the transferring vehicle to the receiving vehicle. Alternatively, a consignment can also be transferred from the receiving vehicle to the transferring vehicle. The transfer can take place here in a more or less targeted or directed fashion. In a simple case, the consignment is easily pushed or positioned on the cargo area of the corresponding vehicle. The orientation of the vehicles with respect to one another and that of the consignment with respect to the vehicles can be significant here. In order to obtain the greatest possible degree of flexibility, the means for transferring the at least one consignment can be embodied in very different ways. There is, depending on requirements, also a need firstly to obtain access to an enclosed cargo space of the receiving vehicle or else to remove the at least one consignment from an enclosed cargo space of the transferring vehicle in order to be able to perform the transfer of the at least one consignment. No matter how the transfer of the at least one consignment has taken place, the transferring vehicle and the receiving vehicle will subsequently move away from one another again and travel onward in different directions and/or at different speeds.

In order to avoid unnecessary repetition and for the sake of better comprehension, the method and the transferring vehicle are described jointly below without respectively differentiating in detail between the method and the transferring vehicle. However, the features which are respectively preferred for the method and/or those which are respectively preferred for the transferring vehicle will nevertheless become clear to the person skilled in the art on the basis of the respective context.

In a first particularly preferred configuration of the method, the transferring vehicle detects, with at least one sensor, the relative speed and/or the relative direction of travel of the receiving vehicle. Alternatively or additionally, the receiving vehicle can, however, also detect, with at least one sensor, the relative speed and/or the relative direction of travel of the transferring vehicle. This is used, to a particular degree, for the precise approach of the vehicles. After the rough approach, the transferring vehicle and the receiving vehicle are then preferably so close to one another that the at least one sensor can detect the other vehicle, in particular the speed and/or the direction of travel thereof. The transferring vehicle and/or the receiving vehicle then does not have to detect its speed and/or its direction of travel in order to subsequently pass on the corresponding information to the other vehicle or to an external control device. Although this would be basically conceivable, the corresponding acquisition of data could be too inaccurate and/or the exchange of data too slow to allow the precise approach to be regulated effectively, quickly and reliably. Consequently it is preferred for the approximation of the speeds and of the directions of travel of the transferring vehicle and of the receiving vehicle to one another to be performed on the basis of the relative speed and/or relative direction of travel, in particular of the respective other vehicle, which are/is detected with at the least one sensor. In this context, the detection of the speed and/or the direction of travel is, depending on requirements, the same as the detection of the information which is associated with the speed and the direction of travel.

If the approximation of the direction of travel and speed is performed both by the transferring vehicle and by the receiving vehicle, it is appropriate if the corresponding regulation process and adaptation by the transferring vehicle and the receiving vehicle are matched to one another. However, the regulation process can also be performed by a regulating unit which can control the adaptation of the speeds and/or the directions of travel of the two vehicles so they are matched to one another. In this context, it is structurally simple, and expedient for the necessary exchange of data, if the regulating unit is carried along by the transferring vehicle or the receiving vehicle. The regulating unit can, however, also be made available externally. However, a reliable and sufficiently fast exchange of data should then be ensured, which will become basically problematic as the distance of the regulating unit from the transferring vehicle and the receiving vehicle increases. During the precise approach, the exchange of data can tend to be provided more easily because of the closer proximity of the vehicles to one another.

In order to simplify the transfer of at least one consignment from the transferring vehicle to the receiving vehicle and/or vice versa, it is appropriate if the transferring vehicle and receiving vehicle travel one next to the other and/or one behind the other after the approximation of the speeds and the directions of travel. Utility vehicles typically have a greater length than width, with the result that there is basically less flexibility during the transfer of the at least one consignment if the vehicles travel one behind the other. The transfer of the consignment is then in fact performed in principle through a rear wall of the one vehicle and a front wall of the other vehicle. However, in this way, the consignment cannot necessarily be placed at any location on the cargo area or the cargo space, for example if the access to this location is blocked by other consignments or another cargo. This is in principle less probable if the vehicles travel one next to the other, in particular if this takes place in a suitable and/or variably offset arrangement in the longitudinal direction of the vehicles. However, there must be sufficient space available for the vehicles to be able to travel one next to the other during the transfer of the at least one consignment.

The transfer of the at least one consignment from the transferring vehicle to the receiving vehicle and/or vice versa can be simplified if after the approximation of the speed and of the direction of travel, the transferring vehicle and the receiving vehicle are mechanically connected to one another, in particular before the transfer of the consignment. This also reduces the regulating expenditure for the further orientation of the vehicles with respect to one another. By means of the mechanical connection it is, in fact, possible to ensure that the two vehicles move at the same speed and with the same direction of travel, or this can be at least assisted by the at least one mechanical connection between the vehicles.

It may be logistically preferred that not only at least one consignment is transferred from the transferring vehicle to the receiving vehicle but also at least one consignment is transferred from the receiving vehicle to the transferring vehicle. In this context, this also preferably takes place while both vehicles are moving, specifically especially with speeds which are approximated to one another and with directions of travel which are approximated to one another. Finally, depending on requirements, the separation between the transferring vehicle and the receiving vehicle can become blurred. It is possible, for example, for one vehicle to be the transferring vehicle with respect to one consignment and the receiving vehicle with respect to another consignment. However, for the sake of easier comprehension, we will continue to refer here to a transferring vehicle and a receiving vehicle.

In order to increase the efficiency of the method, it may be expedient if the transferring vehicle and/or the receiving vehicle travel/travels at least partially autonomously at least during the approximation of the speeds and the directions of travel and/or during the transfer of the at least one consignment. It is therefore possible to provide that the transferring vehicle and/or the receiving vehicle do not require drivers at all. This provides a saving not only in terms of the respective personnel costs but also avoids human errors during the approach and/or during the transfer of the at least one consignment from the transferring vehicle to the receiving vehicle and/or vice versa. However, a driver can also be provided, in which case individual activities are then performed autonomously by the at least one corresponding vehicle. For example, starting from a specific relative position of the transferring vehicle and/or receiving vehicle with respect to one another at least one vehicle can take over and perform autonomously the driving and, if required, the further approach. This can be appropriate because, for example, electronics can perform the, in particular precise, approach of the vehicles better and more reliably. Alternatively or additionally, the autonomous driving of at least one vehicle can make it easier for the two vehicles to travel at a short distance from one another with speeds and directions of travel which are approximated to one another, in particular while the two vehicles are mechanically connected to one another.

Alternatively or additionally, the transfer of the at least one consignment can also take place at least partially autonomously. It may also be expedient here if the transfer of the consignment is controlled by electronics instead of by an operator. The electronics can, if required, perform this task much more accurately and reliably than an operator. However, depending on requirements, this gives rise to a need for corresponding sensors which, for example, sense where the consignment is located, where the consignment can or is to be placed and/or whether the transfer of the consignment has taken place correctly. The at least one corresponding sensor is, if required, connected here to a regulating unit which picks up the information determined by the at least one sensor and converts it into control commands.

The transfer can be simplified further if, before the transfer of the at least one consignment, a cargo space of the transferring vehicle and/or of the receiving vehicle is opened. This can be initiated by a driver without the driver having to perform the opening himself. However, this requires the vehicle to have a device which, after activation, automatically performs the opening of the cargo space. If no driver is provided or if incorrect operator control actions are to be avoided, the cargo space can, however, also be opened completely autonomously, that is to say without intervention by the driver or an operator. Alternatively or additionally, after the transfer of the at least one consignment, a cargo space of the transferring vehicle and/or of the receiving vehicle can be closed, preferably autonomously. In this context, basically the same advantages are achieved as in the case of the corresponding opening of the cargo space.

If at least the transferring vehicle and/or the receiving vehicle have/has an access facility for accessing the cargo space, wherein the access facility for accessing the cargo space can be for example at least one door, one displaceable side wall or side tarpaulin, a rear gantry flap or a roll-up door it is appropriate if, before the transfer of the at least one consignment, an access facility for accessing the cargo space of the transferring vehicle and/or of the receiving vehicle is unlocked, preferably autonomously. The unlocking permits the unimpeded access to the cargo space, which can otherwise, however, be closed off, in order to prevent access by unauthorized persons to the cargo space. If the unlocking is performed autonomously, it is possible to avoid a situation in which the access facility is unlocked by unauthorized persons, for example electronic authorization is performed before the unlocking. Alternatively or additionally, it may be preferred if, after the transfer of the at least one consignment, an access facility for accessing the cargo space of the transferring vehicle and/or of the receiving vehicle is locked. Unauthorized persons then cannot readily gain access to the cargo space. If the locking is performed autonomously, the unlocking and the locking can, if required, take place in the same way, which reduces the structural expenditure. The autonomous locking can, however, also ensure and, if required, document the fact that the locking has been carried out according to specifications. The at least one access facility then does not remain unlocked inadvertently.

In order to perform the rough approach and/or the precise approach of the transferring vehicle and/or of the receiving vehicle reliably, quickly and accurately, it is appropriate if the position of the transferring vehicle and/or of the receiving vehicle is determined at least at time intervals. If this at least one position is known, the respective other vehicle can travel in the direction of the vehicle or in the direction of an estimated future position thereof, preferably on the basis of GNSS (Global Navigation Satellite System) information, for example GPS (Global Positioning System) information, GLONASS information, Galileo information, Beidou information and/or QZSS (Quasi-Zenith Satellite System) information. In the last-mentioned case, the information relating to the speed and the direction of travel of the other vehicle is used to estimate where the vehicle will approximately be located at a time at which a rough approach of the two vehicles to one another could be supposed to have been concluded. In other words, a vehicle travels to a location where it can be expected that the two vehicles will meet at a later time.

During the precise approach, if required information relating to the relative speed and/or the relative direction of travel of the respective other vehicle can be determined directly. For this purpose, the transferring vehicle and/or the receiving vehicle can have corresponding sensors which detect the respective other vehicle and in the process register whether, and in what way, the two vehicles are approaching one another. This permits precise, rapid and reliable regulation of the precise approach. Since the vehicles are located within range of corresponding sensors after the rough approach, the precise approach does not need to take place on the basis of an absolute determination of position; it is instead possible to determine a relative speed and/or a relative direction of travel immediately. A corresponding sensor can therefore determine the change in the distance and in the direction in which the other vehicle is located, in order thereby to derive information for the precise approach.

Alternatively or additionally, information relating to the relative speed and/or the relative direction of travel, information relating to the opening and/or closing of a cargo space and/or information relating to the locking and/or unlocking of an access facility for accessing the cargo space can, for the sake of simplicity and reliability, be transmitted from the transferring vehicle to the receiving vehicle and/or vice versa on the basis of a readable radio frequency identification (RFID) and/or near field communication (NFC) tag, via Bluetooth, a Wireless Local Area Network (WLAN) and/or a mobile radio network, in particular Global System for Mobile Communication (GSM), Universal Mobile Telecommunications System (UMTS) and/or Long Term Evolution (LTE). A radio frequency identification (RFID) tag, a near field communication (NFC) tag and/or Bluetooth can be particularly expediently used for authorization in order to bring about reliable opening, closing, unlocking and locking of the cargo space when the vehicles are located close to one another. If this is not the case and if the vehicles still have to be made to approach one another roughly and/or precisely, it may be more expedient to pass on information by means of a Wireless Local Area Network (WLAN) and/or a mobile radio network because these types of communication basically permit rapid and reliable communication over a large distance.

The transfer of the at least one consignment can expediently take place by means of a transfer device of the transferring vehicle and/or of the receiving vehicle. The transfer device can be carried along here by a vehicle which is intended to transfer a consignment to another vehicle, for which purpose the transfer device is then used. The transfer device can alternatively or additionally also be used to convey a consignment of the other vehicle onto the vehicle comprising the transfer device. In both cases, the transfer device should have as far as possible unimpeded access to the at least one consignment. In addition, there should be sufficient space available for the handling of the at least one consignment. The transfer device can be embodied, for example, as a gripping arm because a gripping arm can be moved in a very versatile manner and can therefore perform very different types of transfer. However, the control of the gripping arm is extremely costly and the gripping arm requires a very large amount of space. In contrast, a type of conveyor belt for conveying the at least one consignment from one vehicle to the other vehicle may be simpler. It may be even simpler if at least one sliding unit and/or rolling unit as well as at least one pushing unit are provided. The pushing unit can push the at least one consignment over to the other vehicle by means of the sliding unit and/or rolling unit.

Alternatively or additionally, the handling of the at least one consignment which is to be transferred can be simplified by virtue of the fact that the consignment is provided on a standardized carrier, in particular a standardized pallet, and/or in a standardized container device, in particular container. Then, even very differently shaped consignments and/or consignments of a very different size can be transferred in the same way or in ways which differ only slightly. The transfer therefore does not have to be individually adapted to the consignment to be transferred, but at most to the carrier.

In terms of the transferring vehicle, it is particularly preferred if it has at least one sensor for determining the relative speed and/or relative direction of travel of the receiving vehicle. This increases the accuracy of the precise approach.

Alternatively or additionally, at least one connecting device can be provided for connecting the transferring vehicle to the receiving vehicle during the transfer of the at least one consignment. The connecting device can then be used to couple the transferring vehicle and the receiving vehicle. The transferring vehicle and the receiving vehicle then at least essentially maintain their relative position during the transfer of the at least one consignment.

So that third-party control of the transferring vehicle is not necessary, or is necessary only to a conditional degree, in particular, however, in order to achieve autonomous travel of the transferring vehicle, at least one control device can be provided for the autonomous travel and/or approach, for detecting the relative speed and/or the relative direction of travel, for the autonomous approximation of the speed and/or of the direction of travel, for the autonomous opening and/or closing of the cargo space, for the autonomous unlocking and/or locking of the access facility for accessing the cargo space, for the autonomous transfer of the at least one consignment and/or for the at least one autonomous control of the transfer device. The control device can therefore control more or less autonomously at least some of the steps and activities which are necessary for transferring the consignment.

BRIEF DESCRIPTION OF THE SEVERAL VIEWS OF THE DRAWING

The invention will be explained in more detail on the basis of a drawing which illustrates at least one exemplary embodiment. In the drawing:

FIGS. 1A-G show various method steps of a first method according to the invention in a schematic illustration;

FIGS. 3A-F show various method steps of a third method according to the invention in a schematic illustration.

DETAILED DESCRIPTION OF THE INVENTION

Figure 1A:
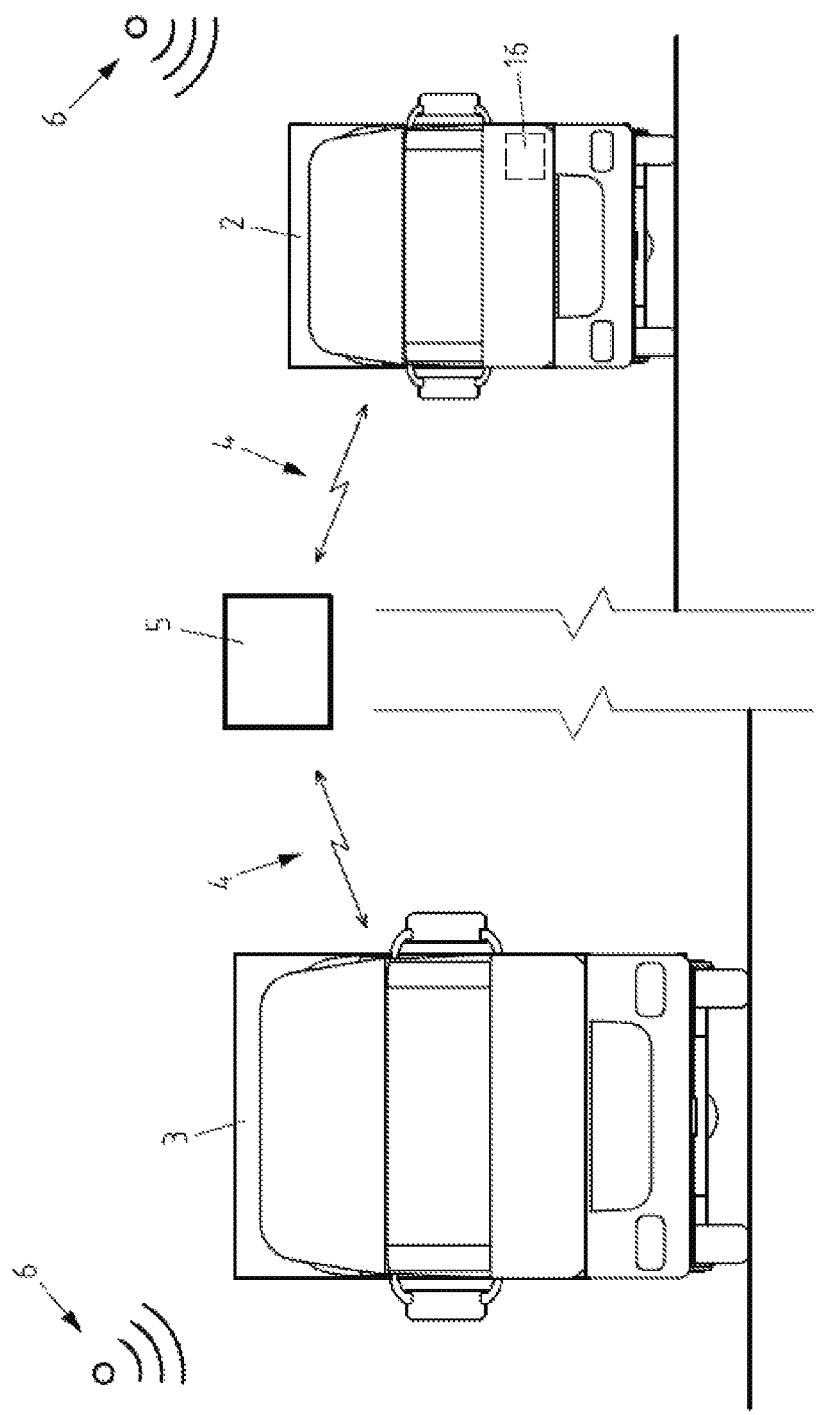

FIG. 1 is a schematic illustration of the sequence of a method for passing on at least one consignment 1 from a transferring vehicle 2 to a receiving vehicle 3. In this context, the transferring vehicle 2 and the receiving vehicle 3 can be made to approach one another roughly, if required, according to FIG. 1A. Firstly, the transferring vehicle 2 and the receiving vehicle 3 are located far away from one another, for example at least so far there is no visual contact between the transferring vehicle 2 and the receiving vehicle 3. So that, for example, the transferring vehicle 2 is then informed about the position of the receiving vehicle 3, the receiving vehicle 3 can detect its position at regular intervals and pass on the position information 4 to a central data acquisition unit 5. For the sake of simplicity, the receiving vehicle 3 uses GNSS (Global Navigation Satellite System) information in the form of GPS (Global Positioning System) information 6 in order to detect its position. The position information 4 of the receiving vehicle can then be passed on to the transferring vehicle 2. This would in principle also be possible directly without the use of a central data acquisition unit 5. The position information 4 would then be processed, for example, in a control unit of the transferring vehicle 2.

In the central data acquisition unit 5 or in the control unit of the transferring vehicle 2, a direction of travel and, if required, also a future position of the receiving vehicle 3 can be derived on the basis of the change in the position information 4 over time. This makes it easier for the transferring vehicle 2 to perform the rough approach to the receiving vehicle 3. Alternatively or additionally, the transferring vehicle 2 can also determine its position, for example on the basis of GNSS (Global Navigation Satellite System) information in the form of GPS (Global Positioning System) information 6 and pass on the corresponding position information 4 to the central data acquisition unit 5 or directly to the receiving vehicle 3. It is therefore possible in an analogous fashion for the receiving vehicle 3 to bring about the rough approach to the transferring vehicle 2. The receiving vehicle 3 must then ensure that the positions of the transferring vehicle 2 and receiving vehicle 3 approach one another. If the transferring vehicle 2 and the receiving vehicle 3 detect their respective positions and pass them on to the respective other vehicle 3,2 or to a central data acquisition unit 5, the transferring vehicle 2 and the receiving vehicle 3 can be controlled on the basis of the corresponding position information 4 in such a way that a rapid approach of the transferring vehicle 2 and receiving vehicle 3 to one another can take place without traveling for unnecessary distances.

The transferring vehicle 2 which is presented and the receiving vehicle 3 which is presented can both be driven by a driver or can drive autonomously. If a driver is present, depending on requirement position information 4 or direction information relating to the other vehicle 3,2 can be displayed to said driver, with the result that he can steer the vehicle 2,3 in the direction of the other vehicle 3,2. For the sake of simplicity, a route in a navigation device, for example, can be proposed to the driver, since the driver must keep to the roads which are present and cannot travel as the bird flies in the direction of the other vehicle 3,2. If the transferring vehicle 2 and/or the receiving vehicle 3 drive autonomously, that is to say without the intervention of a driver, the route and the speed of the corresponding vehicle 2,3 can be determined and predefined directly on the basis of the available position information 4. This can be more efficient than with the involvement of a driver. The latter is, in fact, on the one hand, not necessarily required and can, on the other hand, make subjectively unfavorable decisions in terms of the route and/or the speed of the vehicle 2,3.

After the rough approach of the transferring vehicle 2 and the receiving vehicle 3 has ended, the transferring vehicle 2 and the receiving vehicle 3 can be made to approach one another precisely, which can be based on different information than the rough approach. This is the case, in particular, because the transferring vehicle 2 and the receiving vehicle 3 are then close to one another and, depending on requirements, have visual contact with one another. In this context, visual contact is not necessarily understood only to mean that one vehicle 2,3 can be seen from the other vehicle 3,2, but rather that one vehicle 2,3 can directly detect the other vehicle 3,2 via at least one sensor 7, as illustrated in FIG. 1B.

Figure 1B:
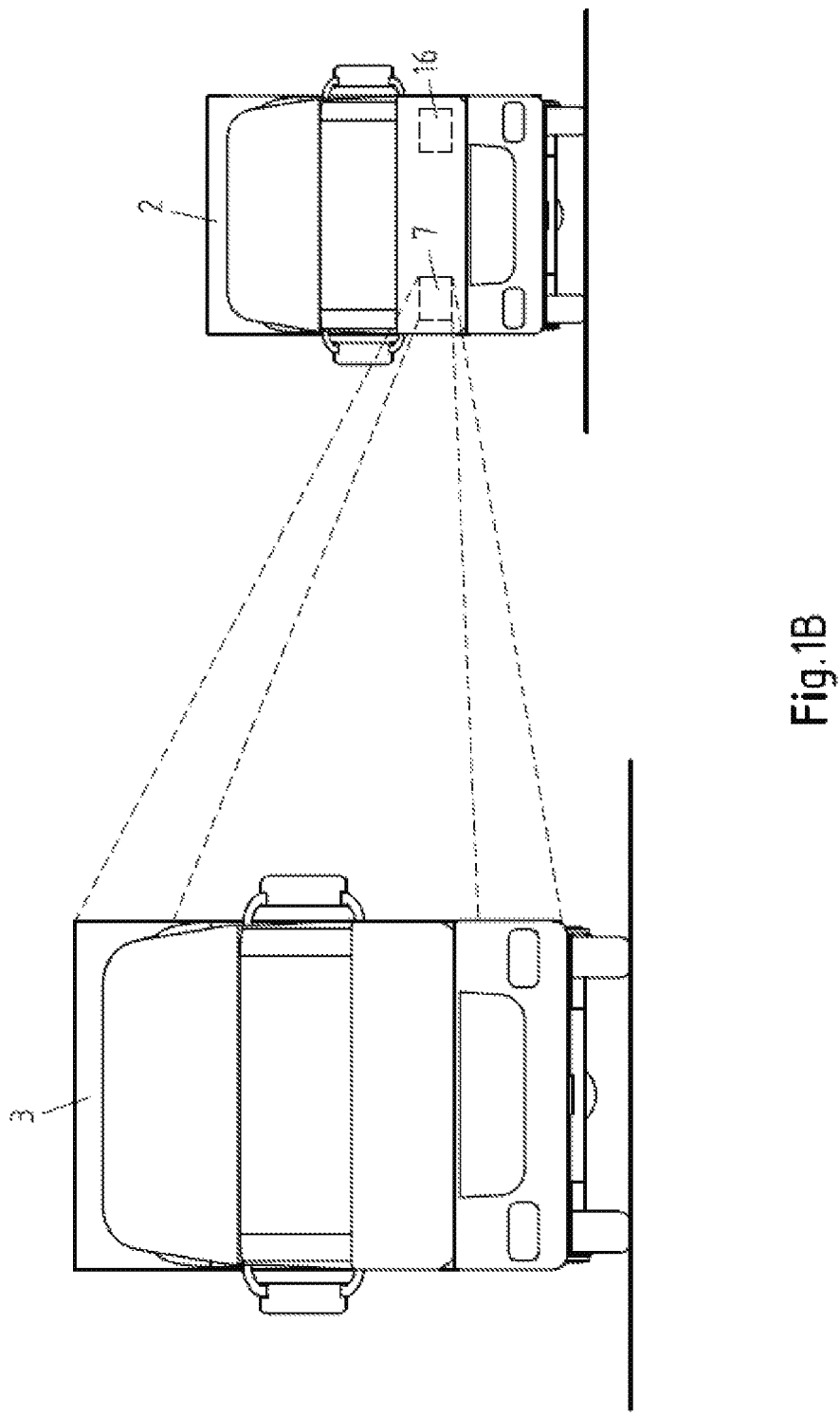

For example, according to FIG. 1B, the transferring vehicle 2 has a sensor 7 which detects the receiving vehicle 3 and can serve to determine the distance between the two vehicles 2,3 and the direction in which the receiving vehicle 3 is located viewed from the transferring vehicle 2. In this context, the sensor 7 can, if required, be an optical sensor or a radar sensor. This information can then be used in order to perform a very accurate further approach of the transferring vehicle 2 and receiving vehicle 3. Alternatively or additionally, it is, of course, also possible for at least one sensor of the receiving vehicle 3 to detect the relative position of the transferring vehicle 2, in order, as a result, to make the approach even more appropriate, or at least to monitor it more appropriately. The approach can then be performed autonomously again optionally from at least one vehicle 2,3. However, it can also be controlled by one driver in any individual case.

Figure 1C:
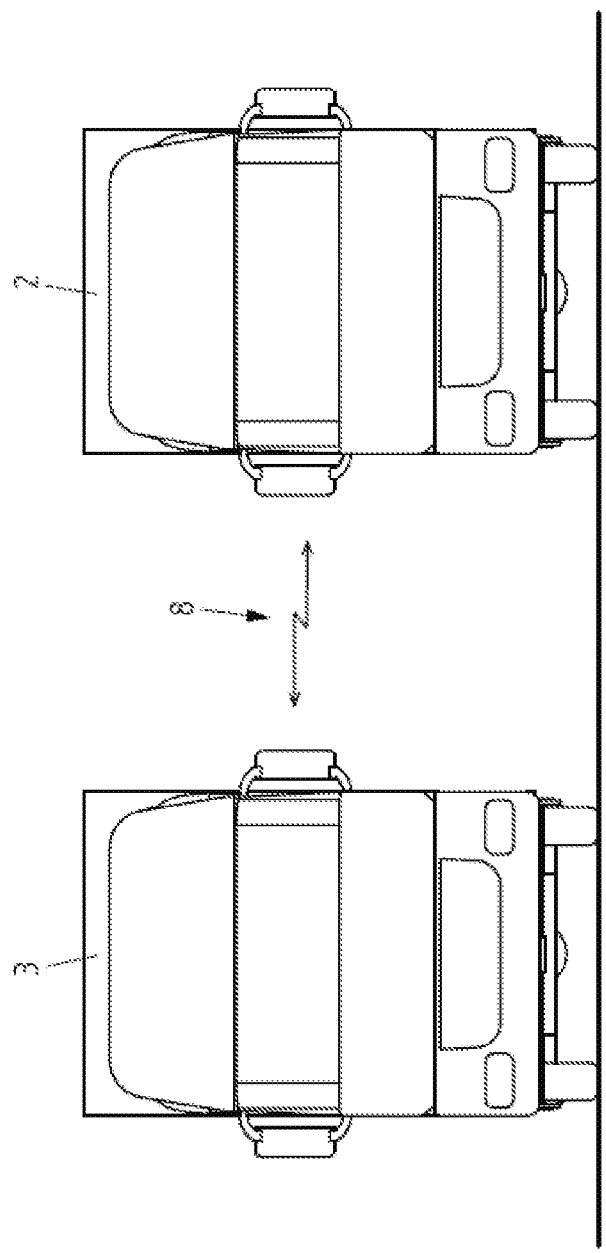

In FIG. 1C, the transferring vehicle 2 and receiving vehicle 3 are illustrated after the precise approach, while the transferring vehicle 2 and the receiving vehicle 3 are traveling at a short distance one next to the other. Communication can then take place between the transferring vehicle 2 and the receiving vehicle 3 in order to pass on information 8, in order to prepare a coordinated transfer of the at least one consignment 1. The communication between the transferring vehicle 2 and the receiving vehicle 3 can take place here by using a radio frequency identification (RFID) tag and/or near field communication (NFC) tag, via Bluetooth, a Wireless Local Area Network (WLAN) and/or a mobile radio network, in particular Global System for Mobile Communication (GSM), Universal Mobile Telecommunications System (UMTS) and/or Long Term Evolution (LTE). The communication can here take place in an encrypted form if required, with the result that the information is not accessible to unauthorized persons. However, during the communication it is also possible to pass on authorization information so that the at least one consignment 1 cannot fall into unauthorized hands.

Figure 1D:
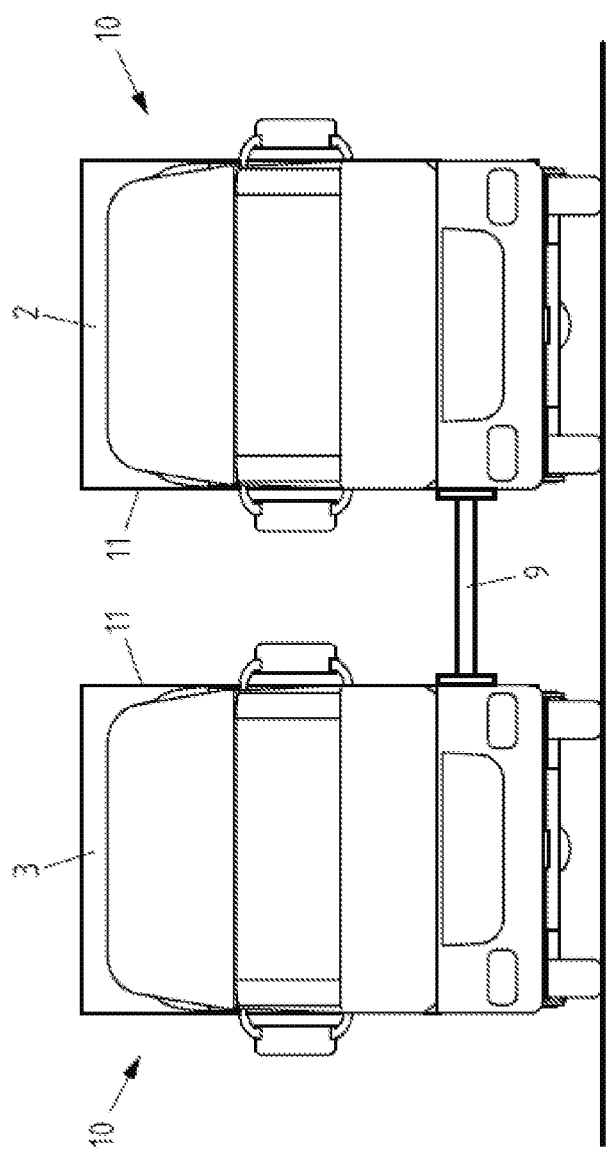

For example, on the basis of the communication of the transferring vehicle 2 and receiving vehicle 3 it is also possible to connect them to one another mechanically, as is illustrated in FIG. 1D. The transferring vehicle 2 and the receiving vehicle 3 are then coupled to form one unit and have an approximately predetermined distance from one another which can also reliably continue to be maintained owing the connection 9. In the illustrated example, the transferring vehicle 2 and the receiving vehicle 3 drive ahead, and after the coupling they drive one next to the other. It would however also be conceivable for the transferring vehicle 2 and the receiving vehicle 3 to travel one behind the other.

If the transferring vehicle 2 and/or the receiving vehicle 3 have an enclosed cargo space 10 and do not have an open cargo area, it is necessary, for the transfer of the at least one consignment 1, to open this cargo space 10, in particular to open an access facility 11 for accessing the cargo space 10. This can also be initiated, depending on requirements, by passing on information 8 within the course of the previously described communication between the transferring vehicle 2 and the receiving vehicle 3. It is therefore possible to detect and communicate, for example, the fact that the coupling has been successfully completed and the cargo space 10 can be opened, wherein authorization for the opening of the at least one cargo space 10 can be a precondition. This authorization can also be provided by means of corresponding communication between the transferring vehicle 2 and the receiving vehicle 3. In this context, before the cargo space 10 is opened, the cargo space 10, in particular an access facility 11, can be unlocked. Cargo spaces 10 can, in fact, typically be locked in order to prevent access to the cargo space 10 by unauthorized persons.

FIG. 1E illustrates a possible way of transferring the at least one consignment 1. A platform 12 is positioned between the vehicles 2,3 in such a way that one end of the platform 12 rests on the transferring vehicle 2, and the opposite end of the platform 12 rests on the receiving vehicle 3, in particular in each case the loading floors of the vehicles 2,3. The at least one consignment 1 can then be pushed from the transferring vehicle 2 to the receiving vehicle 3 by means of a device (not illustrated). As is symbolized in FIG. 1F, at least one consignment 1 can alternatively or additionally also be transferred from the receiving vehicle 3 to the transferring vehicle 2. The transfer of the at least one consignment 1 and the coupling of the transferring vehicle 2 and receiving vehicle 3 can preferably take place autonomously. Human incorrect operation can therefore be ruled out. The same applies to the separation of the transferring vehicle 2 and the receiving vehicle 3 after the transfer of the at least one consignment 1, the closing of the cargo space 10, in particular of an access facility 11, and/or the locking of the cargo space 10, in particular of an access facility 11. Basically, all these activities can, of course, also be performed or triggered manually by an operator.

Figure 1G:
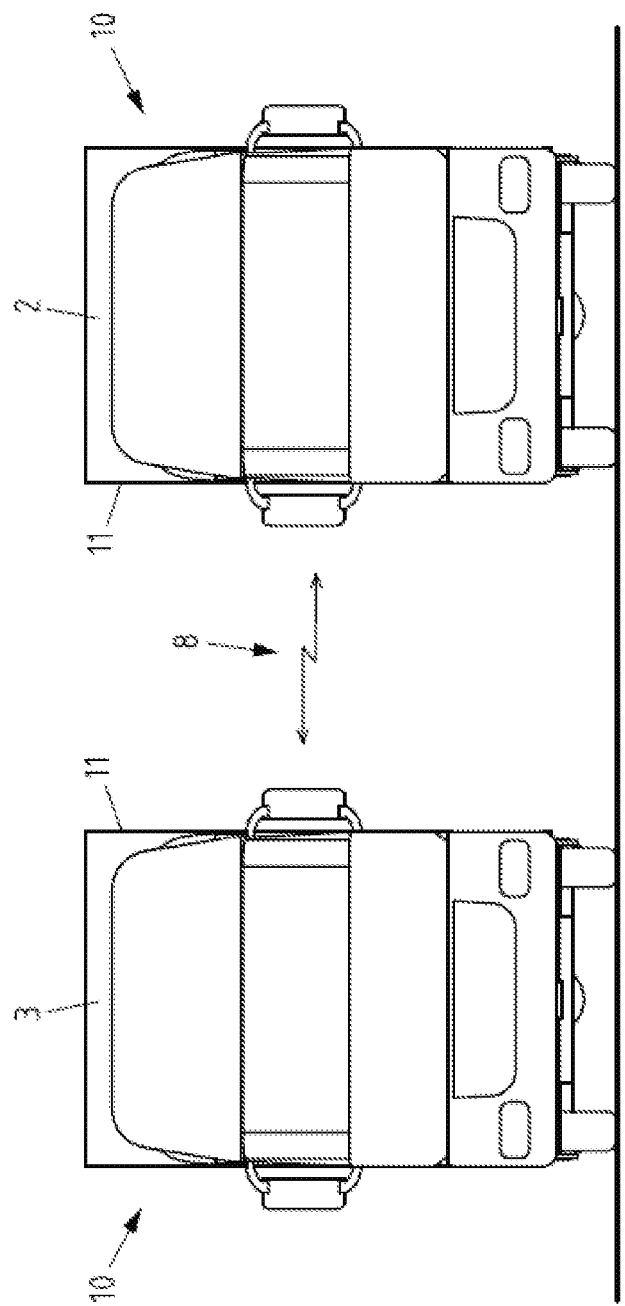

Irrespective of this, the passing on of information 8 between the transferring vehicle 2 and the receiving vehicle 3 can also have an assisting effect, as is symbolized in FIG. 1G. It is therefore possible, for example, to detect and communicate that the transfer of the at least one consignment 1 has been concluded, that the vehicles 2,3 can separate, that separation has taken place, that an access facility 11 for accessing the cargo space 10 can be closed and/or locked, and/or that an access facility 11 for accessing the cargo space is closed and/or locked.

Figure 2:
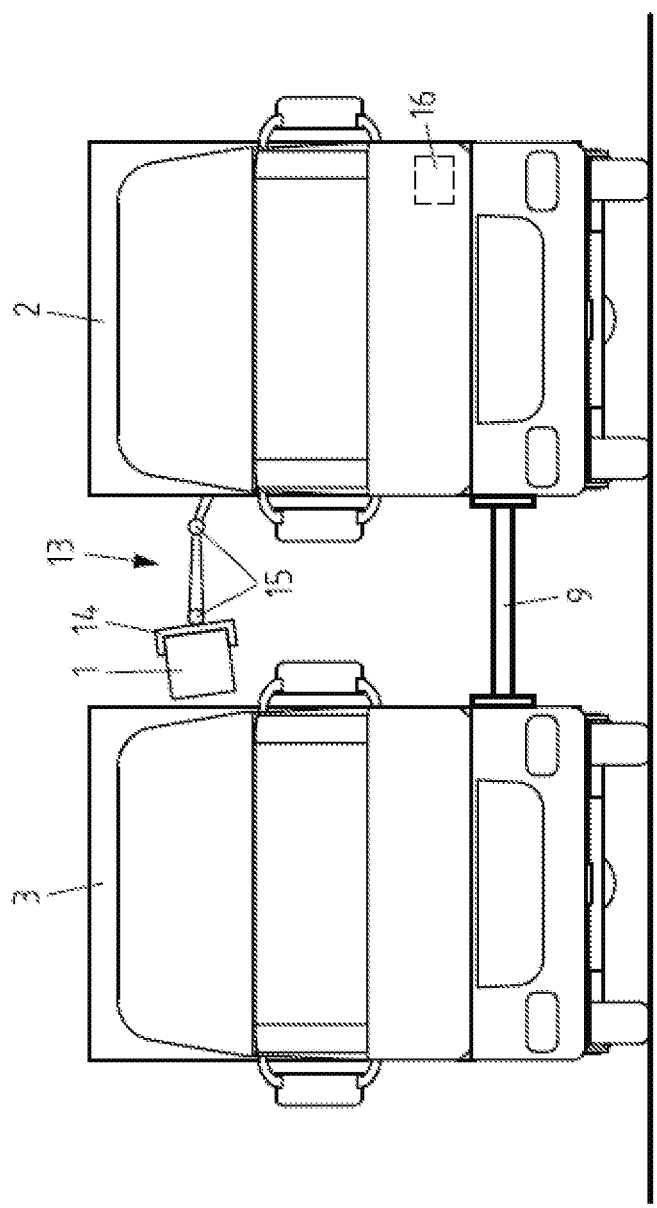
FIG. 2 shows a method step of a second method according to the invention in a schematic illustration.

FIG. 2 illustrates an alternative to the transfer of the at least one consignment 1 which is illustrated in FIGS. 1E and 1F. In this context, the transferring vehicle 2 makes use, in fact, of a transfer device 13 in the form of a gripping arm which is carried along by the transferring vehicle 2 and which has a gripping section 14 for gripping consignments 1 with very different shapes and very different sizes. By means of this transfer device 13 it is also easily possible to remove at least one consignment 1 from the receiving vehicle 3, with the result that the receiving vehicle 3 likewise does not have to have a separate transfer device in order to exchange consignments 1. In order to be able to use the transfer device 13 in the form of the gripping arm in a very flexible way, the transfer device 13 preferably has a plurality of joints 15.

In addition, the transferring vehicle 2 and/or the receiving vehicle 3 has a control device 16 which can control the rough and/or precise approach of the transferring vehicle 2 and receiving vehicle 3. The control device 16 can alternatively or additionally also be used to receive, transmit and process information 8. The control device serves, depending on requirements, for opening the cargo space 10, unlocking the access facility 11, closing the cargo space 10 and/or locking the access facility 11.

Figure 3A:
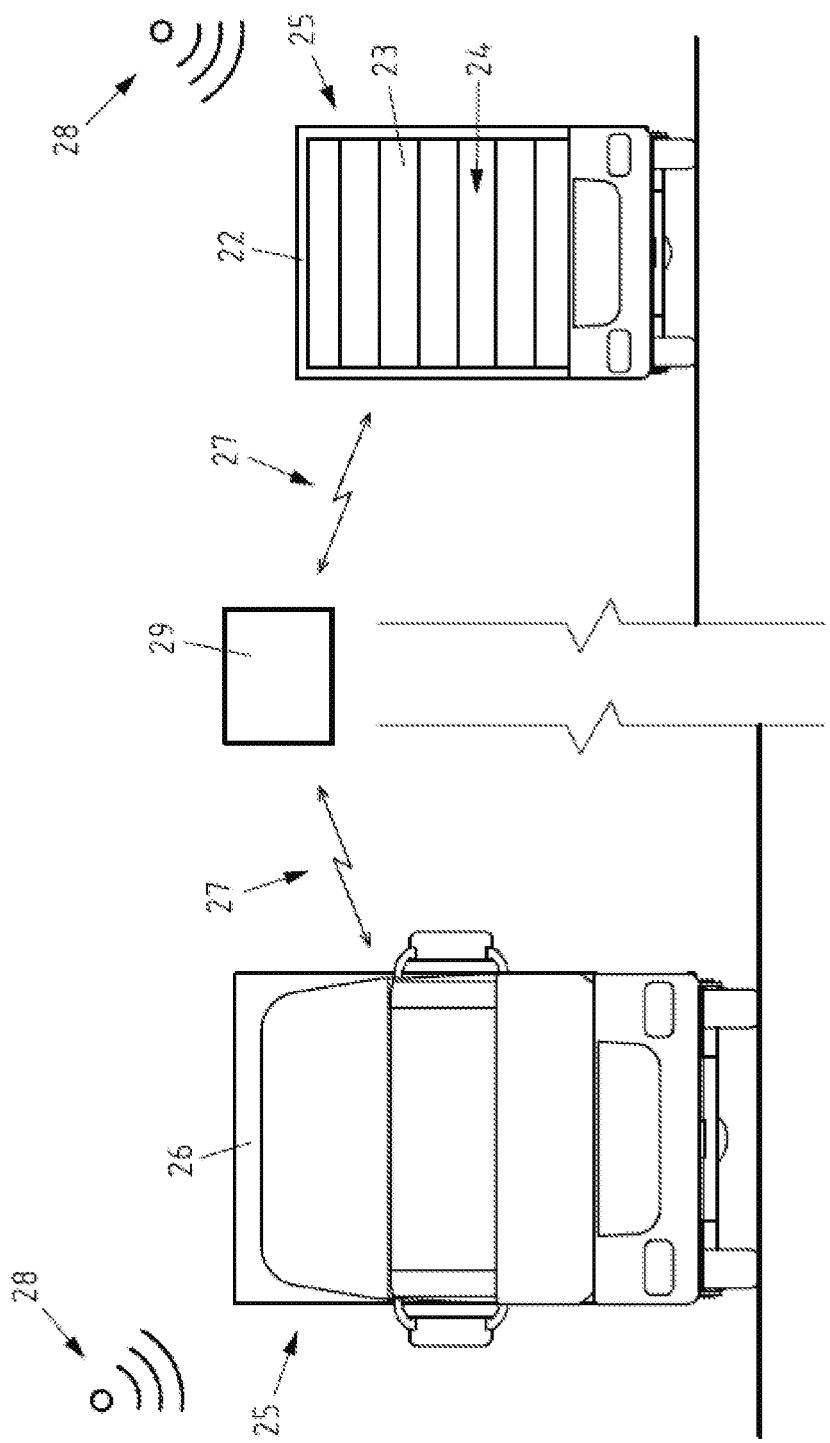
Figure 3B:
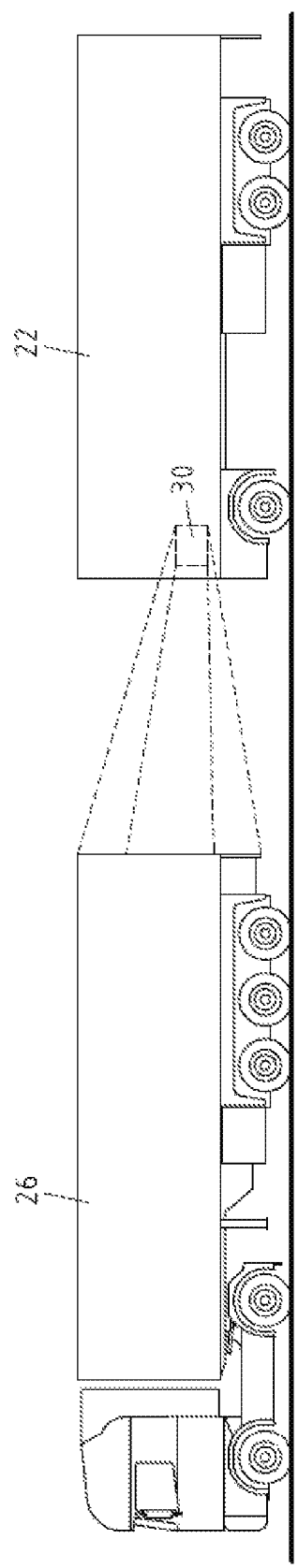

FIG. 3 illustrates a refinement of the method described above for transferring at least one consignment 21. In this method, at least the transferring vehicle 22 is autonomous and therefore does not require a driver. This permits an access facility 23 to be integrated into the front wall 24 of the transferring vehicle 22. In the example illustrated in FIG. 3A, the access facility 23 is a roll-up door which can be moved upward in order to clear the access to the cargo space 25. Even when using such a transferring vehicle 22, the rough approach between the transferring vehicle 22 and receiving vehicle 26 can take place as already described above. The transferring vehicle 22 and/or the receiving vehicle 26 can determine position information 27, for example on the basis of GNSS (Global Navigation Satellite System) information in the form of GPS information 28 and pass it on to the corresponding other vehicle 26,22 or to a central data acquisition unit 29. For this purpose, the use of a mobile radio network is appropriate, for example.

If the rough approach of the transferring vehicle 22 and receiving vehicle 26 has taken place, the transferring vehicle 22 is located, for example behind the receiving vehicle 26 and detects the receiving vehicle 26 with a sensor 30, in order to perform the precise approach of the transferring vehicle 22 and receiving vehicle 26 autonomously. This is symbolized in FIG. 3B. In the illustrated example, the receiving vehicle 26 simply travels onward without being actively involved in the precise approach. This is left to the autonomously traveling transferring vehicle 22 which can perform this task very accurately and reliably. The transferring vehicle 22 therefore drives up very close to the rear end of the receiving vehicle 26.

Figure 3C:
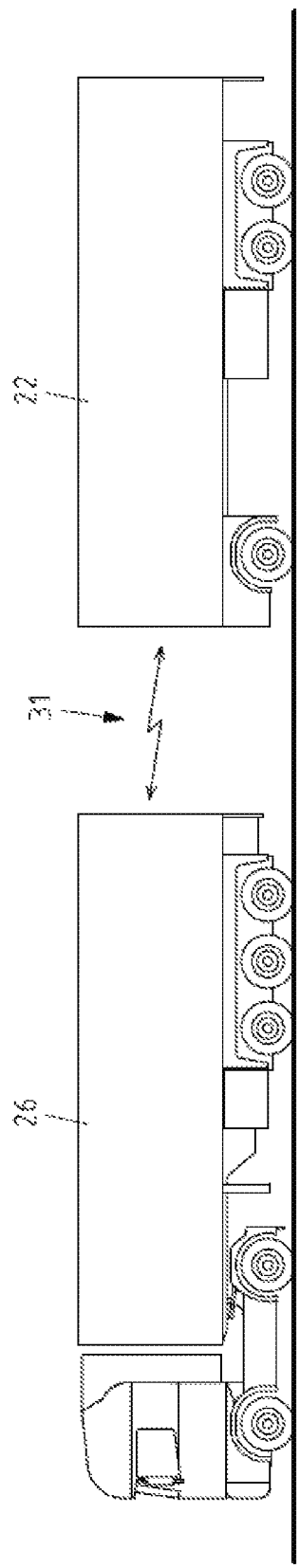

The transferring vehicle 22 and the receiving vehicle 26 can now communicate with one another, as illustrated in FIG. 3C, and, for example, conduct information 31 relating to the unlocking and opening of the access facilities 23 for accessing the cargo space 25 of the receiving vehicle 26 in the form of tailgate doors. For example, the transferring vehicle 22 can form a mechanical connection 32 to the receiving vehicle 26 in order to keep the distance between the transferring vehicle 22 and the receiving vehicle 26 approximately constant. The transferring vehicle 22 additionally unlocks and opens its access facility 23 for accessing the cargo space 25, after which at least one consignment 21 is transferred from the transferring vehicle 22 to the receiving vehicle 26, as is illustrated in FIG. 3D. If required, at least one consignment 21 is also transferred from the receiving vehicle 26 to the transferring vehicle 22. Different transfer devices, for example the transfer devices already described above, can be provided for the respective transfer.

After the transfer has taken place, for example the situation illustrated in FIG. 3E is brought about in which the transferring vehicle 22 has already been uncoupled from the receiving vehicle 26. Further communication relating to the exchange of information 33 takes place, for example, by Bluetooth, which communication initiates the closing and locking of the access facility 23 for accessing the cargo space 25 of the receiving vehicle 26. The transferring vehicle 22 also closes its access facility 23 for accessing the cargo space 25, and the transferring vehicle 22 and the receiving vehicle 26 move away from one another again, as is illustrated in FIG. 3F.

Figure 4:
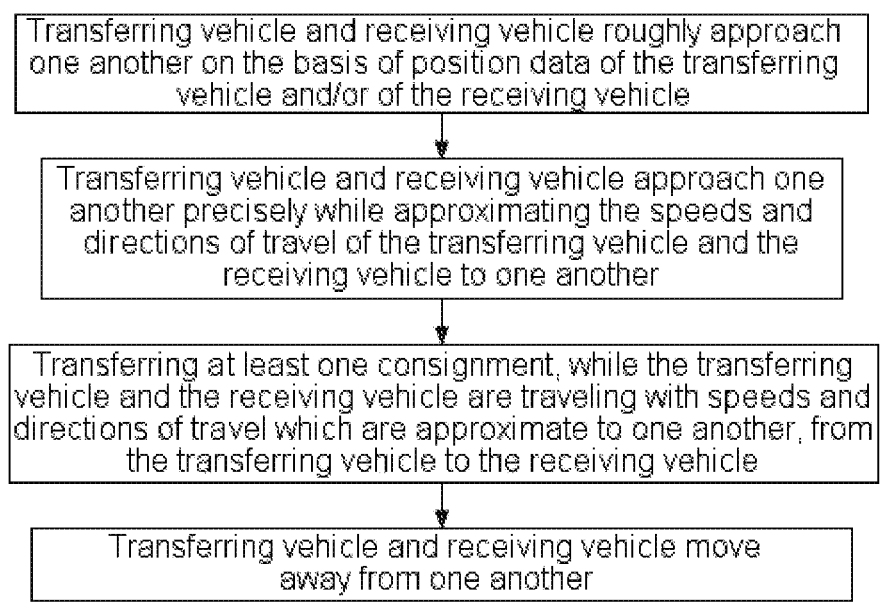
FIG. 4 shows a schematic block flowchart of the method for passing on at least one consignment from a transferring vehicle to a receiving vehicle.

In FIG. 4, the basic method sequence is illustrated again in the form of a block flowchart. Firstly, a rough approach of the transferring vehicle and receiving vehicle takes place on the basis of position data of the transferring vehicle and/or of the receiving vehicle. Subsequently, a precise approach of the transferring vehicle and receiving vehicle is performed while approximating the speeds and the directions of travel of the transferring vehicle and the receiving vehicle to one another. Once this has taken place, during the travel of the transferring vehicle and of the receiving vehicle with speeds and directions of travel which are approximated to one another, the at least one consignment is transferred from the transferring vehicle to the receiving vehicle. After the transfer of the at least one consignment, the transferring vehicle and the receiving vehicle move away from one another again.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for passing on at least one consignment from a transferring vehicle to a receiving vehicle, comprising:
   making the transferring vehicle and the receiving vehicle roughly approach one another on the basis of position data of the transferring vehicle and/or of the receiving vehicle,
   after the transferring vehicle and the receiving vehicle have been made to roughly approach one another, making the transferring vehicle and the receiving vehicle approach one another precisely while approximating the speeds and the directions of travel of the transferring vehicle and the receiving vehicle to one another,
   transferring while the transferring vehicle and the receiving vehicle are traveling with speeds and directions of travel which are approximate to one another, the at least one consignment from the transferring vehicle to the receiving vehicle, and
   after the transfer of the at least one consignment has taken place, causing the transferring vehicle and the receiving vehicle to move away from one another;
   further comprising detecting, with at least one sensor of the transferring vehicle, the relative speed and/or the relative direction of travel of the receiving vehicle, and/or detecting, with at least one sensor of the receiving vehicle, the relative speed and/or the relative direction of travel of the transferring vehicle, and
   approximating the speeds and the directions of travel of the transferring vehicle and the receiving vehicle to one another on the basis of the relative speed and/or relative direction of travel detected with the at least one sensor.

2. The method according to claim 1,
   in which the transferring vehicle and the receiving vehicle travel one next to the other and/or one behind the other after the approximation of the speeds and of the directions of travel.

3. The method according to claim 1,
   further comprising, after the adaptation of the speed and of the direction of travel, mechanically connecting the transferring vehicle and the receiving vehicle are to one another, in particular before the transfer of the consignment.

4. The method according to claim 1,
in which the transferring vehicle and/or the receiving vehicle travel/travels at least partially autonomously at least during the approximation of the speeds and the directions of travel and/or during the transfer of the at least one consignment.

5. The method according to claim 1,
further comprising, for the rough approach and/or for the precise approach, determining the position of the transferring vehicle and/or of the receiving vehicle at least at time intervals, preferably on the basis of GNSS (Global Navigation Satellite System) information, for example in the form of GPS (Global Positioning System) information, GLONASS information, Galileo information, Beidou information and/or QZSS (Quasi-Zenith Satellite System) information, and
passing on the position or a piece of information derived therefrom to the transferring vehicle, the receiving vehicle and/or a control device.

6. The method according claim 1,
further comprising, during the precise approach, passing on information relating to the relative speed and/or the relative direction of travel from the transferring vehicle to the receiving vehicle and/or vice versa.

7. The method according to claim 1,
further comprising providing the consignment on a standardized carrier, in particular a standardized pallet and/or in a standardized container device, in particular container.

8. A transferring vehicle for performing the method according to claim 1.

9. The transferring vehicle according to claim 8,
characterized in that
at least one connecting device is provided for connecting the transferring vehicle to the receiving vehicle during the transfer of the at least one consignment.

10. A method for passing on at least one consignment from a transferring vehicle to a receiving vehicle, comprising:
making the transferring vehicle and the receiving vehicle roughly approach one another on the basis of position data of the transferring vehicle and/or of the receiving vehicle,
after the transferring vehicle and the receiving vehicle have been made to roughly approach one another, making the transferring vehicle and the receiving vehicle approach one another precisely while approximating the speeds and the directions of travel of the transferring vehicle and the receiving vehicle to one another,
transferring while the transferring vehicle and the receiving vehicle are traveling with speeds and directions of travel which are approximate to one another, the at least one consignment from the transferring vehicle to the receiving vehicle, and
after the transfer of the at least one consignment has taken place, causing the transferring vehicle and the receiving vehicle to move away from one another;
further comprising, while the transferring vehicle and the receiving vehicle are each traveling with an approximate speed and direction of travel, transferring a consignment from the receiving vehicle to the transferring vehicle.

11. A method for passing on at least one consignment from a transferring vehicle to a receiving vehicle, comprising:
making the transferring vehicle and the receiving vehicle roughly approach one another on the basis of position data of the transferring vehicle and/or of the receiving vehicle,
after the transferring vehicle and the receiving vehicle have been made to roughly approach one another, making the transferring vehicle and the receiving vehicle approach one another precisely while approximating the speeds and the directions of travel of the transferring vehicle and the receiving vehicle to one another,
transferring while the transferring vehicle and the receiving vehicle are traveling with speeds and directions of travel which are approximate to one another, the at least one consignment from the transferring vehicle to the receiving vehicle, and
after the transfer of the at least one consignment has taken place, causing the transferring vehicle and the receiving vehicle to move away from one another;
in which the transfer of the at least one consignment takes place at least partially autonomously.

12. A method for passing on at least one consignment from a transferring vehicle to a receiving vehicle, comprising:
making the transferring vehicle and the receiving vehicle roughly approach one another on the basis of position data of the transferring vehicle and/or of the receiving vehicle,
after the transferring vehicle and the receiving vehicle have been made to roughly approach one another, making the transferring vehicle and the receiving vehicle approach one another precisely while approximating the speeds and the directions of travel of the transferring vehicle and the receiving vehicle to one another,
transferring while the transferring vehicle and the receiving vehicle are traveling with speeds and directions of travel which are approximate to one another, the at least one consignment from the transferring vehicle to the receiving vehicle, and
after the transfer of the at least one consignment has taken place, causing the transferring vehicle and the receiving vehicle to move away from one another;
further comprising, before the transfer of the at least one consignment, opening a cargo space of the transferring vehicle and/or of the receiving vehicle, preferably autonomously, and/or
further comprising, after the transfer of the at least one consignment, closing a cargo space of the transferring vehicle and/or of the receiving vehicle, preferably autonomously.

13. A method for passing on at least one consignment from a transferring vehicle to a receiving vehicle, comprising:
making the transferring vehicle and the receiving vehicle roughly approach one another on the basis of position data of the transferring vehicle and/or of the receiving vehicle,
after the transferring vehicle and the receiving vehicle have been made to roughly approach one another, making the transferring vehicle and the receiving vehicle approach one another precisely while approximating the speeds and the directions of travel of the transferring vehicle and the receiving vehicle to one another,
transferring while the transferring vehicle and the receiving vehicle are traveling with speeds and directions of travel which are approximate to one another, the at least one consignment from the transferring vehicle to the receiving vehicle, and after the transfer of the at least one consignment has taken place, causing the transferring vehicle and the receiving vehicle to move away from one another;

further comprising, before the transfer of the at least one consignment, unlocking an access facility for accessing the cargo space of the transferring vehicle and/or of the receiving vehicle, preferably autonomously, and/or further comprising, after the transfer of the at least one consignment, locking an access facility for accessing the cargo space of the transferring vehicle and/or of the receiving vehicle, preferably autonomously.

14. A method for passing on at least one consignment from a transferring vehicle to a receiving vehicle, comprising:

making the transferring vehicle and the receiving vehicle roughly approach one another on the basis of position data of the transferring vehicle and/or of the receiving vehicle, after the transferring vehicle and the receiving vehicle have been made to roughly approach one another, making the transferring vehicle and the receiving vehicle approach one another precisely while approximating the speeds and the directions of travel of the transferring vehicle and the receiving vehicle to one another, transferring while the transferring vehicle and the receiving vehicle are traveling with speeds and directions of travel which are approximate to one another, the at least one consignment from the transferring vehicle to the receiving vehicle, and after the transfer of the at least one consignment has taken place, causing the transferring vehicle and the receiving vehicle to move away from one another;

further comprising transmitting information relating to the relative speed and/or the relative direction of travel, information relating to the opening and/or closing of a cargo space and/or information relating to the locking and/or unlocking of an access facility for accessing the cargo space from the transferring vehicle to the receiving vehicle and/or vice versa on the basis of a readable radio frequency identification (RFID) and/or near field communication (NFC) tag, via Bluetooth, a Wireless Local Area Network (WLAN) and/or a mobile radio network, in particular Global System for Mobile Communication (GSM), Universal Mobile Telecommunications System (UMTS) and/or Long Term Evolution (LTE).

15. A method for passing on at least one consignment from a transferring vehicle to a receiving vehicle, comprising:

making the transferring vehicle and the receiving vehicle roughly approach one another on the basis of position data of the transferring vehicle and/or of the receiving vehicle, after the transferring vehicle and the receiving vehicle have been made to roughly approach one another, making the transferring vehicle and the receiving vehicle approach one another precisely while approximating the speeds and the directions of travel of the transferring vehicle and the receiving vehicle to one another, transferring while the transferring vehicle and the receiving vehicle are traveling with speeds and directions of travel which are approximate to one another, the at least one consignment from the transferring vehicle to the receiving vehicle, and after the transfer of the at least one consignment has taken place, causing the transferring vehicle and the receiving vehicle to move away from one another;

wherein transferring the at least one consignment includes transferring, preferably autonomously, by means of a transfer device of the transferring vehicle and/or of the receiving vehicle.

16. The method according to claim 15, wherein the transfer device includes a conveyor belt and/or a gripping arm.

17. A transferring vehicle for performing a method for passing on at least one consignment from a transferring vehicle to a receiving vehicle, the method comprising:

making the transferring vehicle and the receiving vehicle roughly approach one another on the basis of position data of the transferring vehicle and/or of the receiving vehicle, after the transferring vehicle and the receiving vehicle have been made to roughly approach one another, making the transferring vehicle and the receiving vehicle approach one another precisely while approximating the speeds and the directions of travel of the transferring vehicle and the receiving vehicle to one another, transferring while the transferring vehicle and the receiving vehicle are traveling with speeds and directions of travel which are approximate to one another, the at least one consignment from the transferring vehicle to the receiving vehicle, and after the transfer of the at least one consignment has taken place, causing the transferring vehicle and the receiving vehicle to move away from one another;

wherein the transferring vehicle comprises at least one sensor is for determining the relative speed and/or the relative direction of travel of the receiving vehicle.

18. A transferring vehicle for performing a method for passing on at least one consignment from a transferring vehicle to a receiving vehicle, comprising:

making the transferring vehicle and the receiving vehicle roughly approach one another on the basis of position data of the transferring vehicle and/or of the receiving vehicle, after the transferring vehicle and the receiving vehicle have been made to roughly approach one another, making the transferring vehicle and the receiving vehicle approach one another precisely while approximating the speeds and the directions of travel of the transferring vehicle and the receiving vehicle to one another, transferring while the transferring vehicle and the receiving vehicle are traveling with speeds and directions of travel which are approximate to one another, the at least one consignment from the transferring vehicle to the receiving vehicle, and after the transfer of the at least one consignment has taken place, causing the transferring vehicle and the receiving vehicle to move away from one another;

wherein the transferring vehicle comprises at least one control device for the autonomous travel and/or approach, for detecting the relative speed and/or the relative direction of travel, for the autonomous approximation of the speed and/or of the direction of travel, for the autonomous opening and/or closing of the cargo space, for the autonomous unlocking and/or locking of the access facility for accessing the cargo space, for the autonomous transfer of the at least one consignment and/or for the at least one autonomous control of the transfer device.

\* \* \* \* \*